United States Patent [19]

Sakurada et al.

[11] Patent Number: 4,639,747

[45] Date of Patent: Jan. 27, 1987

[54] RECORDING HEAD DRIVE CONTROL APPARATUS

[75] Inventors: Nobuaki Sakurada, Yokohama; Hideaki Kawamura; Takashi Sasaki, both of Tokyo, all of Japan

[73] Assignee: Canon Kabushiki Kaisha, Tokyo, Japan

[21] Appl. No.: 619,340

[22] Filed: Jun. 11, 1984

[30] Foreign Application Priority Data

Jun. 22, 1983 [JP] Japan ................................ 58-112563

[51] Int. Cl.$^4$ ................................................ G01D 15/18

[52] U.S. Cl. .................................. 346/140 R; 358/75; 358/298

[58] Field of Search ............. 346/140 R, 75; 358/298, 358/299, 75

[56] References Cited

U.S. PATENT DOCUMENTS 4,266,232 5/1981 Juliana ................................ 346/140
4,300,144 11/1981 Isayama ................................ 346/140
4,513,297 4/1985 Okamura ............................. 346/140
4,515,487 5/1985 Minami ........................... 346/140 X
4,528,576 7/1985 Koumura ........................... 346/140

*Primary Examiner*—Joseph W. Hartary
*Attorney, Agent, or Firm*—Fitzpatrick, Cella, Harper & Scinto

[57] ABSTRACT

There is provided a liquid jet recording apparatus comprising: recording heads whose recording densities vary in response to drive signals; drive circuits to drive the recording heads; a control circuit to output the drive signals through the drive circuits to the recording heads; and a timing pulse generator to supply a drive timing pulse for the recording heads to the drive circuits. During the recording interval, the timing pulse generator supplies the drive timing pulse even when all of or a part of the recording heads are not driven. At this time, the control circuit controls the levels of the drive signals for the recording heads which are not driven to less than the coloring threshold value of those recording heads. As a result, the multihead drive control section in the multihead recording apparatus such as a full color printer can be constituted by a simple circuit.

16 Claims, 5 Drawing Figures

RECORDING HEAD DRIVE CONTROL APPARATUS

BACKGROUND OF THE INVENTION

1. Field of the Invention

The present invention relates to a recording head drive control apparatus for use in a recording apparatus which forms characters, symbols, figures, etc. on a recording medium.

2. Description of the Prior Art

Conventionally, in non-impact recording apparatuses, for example, in liquid jet recording apparatuses, they are provided with a switching circuit to control the operation and non-operation of the recording head and a drive circuit to apply a drive voltage or current to the recording head in accordance with the image data input and they are constituted in a manner such that when the recording head is not driven during the recording operation, the switching circuit is controlled so that the drive voltage or current is not applied to the recording head.

However, the recording head driving apparatus with such a construction requires such a switching circuit and drive circuit for every recording head. Therefore, in the image forming apparatus employing this driving apparatus, particularly, in the multihead recording apparatus such as a full color printer or the like, the circuitry becomes complicated as will be explained later in conjunction with FIGS. 1 to 3, so that this causes the apparatus to be increased in size and the manufacturing cost to be raised.

The conventional recording apparatus will now be described hereinbelow.

FIG. 1 shows a fundamental arrangement of the conventional recording head drive circuit, in which a reference numeral 1 denotes a drive voltage source; 2 is a pnp switching transistor as an example of a switching element; 3 is a piezoelectric element as an example of a liquid jet head driving member; and 4 to 7 are resistors. When a control pulse of the polarity shown in the diagram is now applied to the resistor 7, the piezoelectric element 3 contracts since it is charged in the polarizing direction thereof through the resistor 4 by a drive voltage of the voltage source 1, so that the volume of a pressure chamber in the jet head is reduced and a recording liquid droplet is discharged. Upon completion of the control pulse, the charges accumulated in the piezoelectric element 3 are discharged through the resistor 5. Although the arrangement of the recording head drive circuit has been variously improved and modified, the essential point is that the recording image is formed by controlling the discharge and stop of the recording liquid by means of the liquid jet head and the like in response to the on-off operations of the switching element. In addition, since the construction of the liquid jet head and means for discharging the recording liquid droplet thereof are well known to those skilled in the art, their detailed descriptions are omitted here.

FIG. 2 shows an example of the conventional recording apparatus provided with the recording head drive circuit of FIG. 1. In FIG. 2, a numeral 11 indicates a voltage converting table circuit; 12 is a line memory; 13 a latch circuit; 14Y to 14BK are D-A converters for every chrominance signal of the recording liquid; 22Y to 22BK are drive voltage amplifiers which respectively correspond to the D-A converters 14Y to 14BK; 23Y to 23BK are NAND gates which are respectively provided for every chrominance signal; and 24 is a timing pulse generator. A timing pulse $T_p$ generated from the timing pulse generator 24 and signals $\phi_Y$–$\phi_{BK}$ representing that the recording operations are performed with regard to the recording heads for every chrominance signal are supplied to the NAND gates 23Y–23BK. Numerals 15Y to 15BK are recording head drive circuits which are controlled in response to outputs of the NAND gates 23Y–23BK and drive a recording head 16Y and the like in response to the outputs of the amplifiers 22Y–22BK.

As will be explained later with respect to FIG. 4, the front stage of the voltage converting table circuit 11 is constituted in the manner such that image signals R, G and BL are input to A-D converters and are converted to digital signals at predetermined timings on the basis of the sync signals and then they are input to an image processing circuit. In the image processing circuit, image signals R′, G′ and BL′ which were converted to the digital signals are further converted to chrominance signals Y, M, C and BK of the recording liquids. These chrominance signals are converted by the voltage converting table circuit 11 to digital data corresponding to the voltage values which are applied to the recording heads. These data are input to the line memory 12 and the data of the necessary capacity are stored therein. These data stored are fetched into the latch circuit 13 at a predetermined timing and are converted to the analog signals by the D-A converters 14Y–14BK. These analog signals are input to the recording head drive circuits 15Y–15BK. The internal arrangement of each of these drive circuits is the same as the drive circuit of FIG. 1 as typically shown in FIG. 2 with regard to 15Y. Namely, the output of the NAND gate 23Y or the like is supplied to the base of the switching transistor and the output of the amplifier 22Y or the like is supplied to the emitter thereof, and the piezoelectric element 16Y or the like is driven similarly to the circuit of FIG. 1.

In the system shown in FIG. 2, the gate circuits (in this example, the NAND gates 23Y–23BK) in addition to the amplifiers 22Y–22BK are needed among the D-A converters 14Y–14BK and the drive circuits 15Y–15BK for every recording head. Thus, the circuit arrangement becomes complicated in the multihead recording apparatus and this causes the apparatus to be increased in size and the cost to be raised.

FIG. 3 shows another example of the recording apparatus provided with the conventional recording head control system. Although the latch circuit 13 and the subsequent circuit arrangement are shown in this diagram, the front stage thereof is fundamentally similar to that of FIG. 2. In the apparatus of FIG. 3, a preset register 25 is provided, and the magnitude of a digital value A of each chrominance signal which is an output of the latch circuit 13 and the magnitude of an output B of the preset register 25 are compared by a comparator 26Y or the like. When A>B, an output of the comparator 26Y or the like becomes a high level and the NAND gate 23Y or the like is controlled in response to this output and the timing pulse which is output from the timing pulse generator 24. Also, in FIG. 3, numerals 15′M, 15′C and 15′BK represent the circuits each totally corresponding to the D-A converter 14Y, amplifier 22Y, comparator 26Y, NAND gate 23Y, and recording head drive circuit 15Y for the chrominance signal Y with respect to the chrominance signals M, C and BK. In the apparatus of FIG. 3, the circuit arrangement obviously becomes complicated similarly to the apparatus of FIG. 2.

As described above, the conventional driving apparatus requires the switching circuit and drive circuit for each recording head. Also, it is necessary to constitute the apparatus such that no drive voltage or current is applied to the recording head by controlling the switching circuit when the recording is not done. Therefore, the circuit arrangement becomes complicated.

SUMMARY OF THE INVENTION

A first object of the present invention is to eliminate the above-described drawbacks in the conventional apparatus and to provide a recording head drive control apparatus which can constitute the recording head drive control section by a simple circuit.

A second object of the invention is to provide a recording head drive control apparatus which can constitute the recording head drive control section by a simple circuit in a multihead recording apparatus using a plurality of recording heads which perform the recording operations of different densities in response to drive signal.

A third object of the invention is to provide a recording head control apparatus which has the recording head whose recording density varies depending upon the level of the drive signal and timing pulse generating means for supplying a drive timing pulse of the recording head even when the recording is not performed, whereby the drive signal level is controlled to less than the threshold value at which the recording is possible when the recording is not done.

A fourth object of the invention is to provide a multi-recording head drive control apparatus which has a plurality of recording heads whose recording densities vary in response to the drive signal, a plurality of drive circuits to drive the plurality of recording heads, and timing pulse generating means for supplying the drive timing pulse to the drive circuits even when all of or a part of the plurality of recording heads are not driven, wherein the levels of the drive signals corresponding to the recording heads which are not driven among the drive signals are controlled to less than the threshold value at which the recording is possible.

The above and other objects, features and advantages of the present invention will become apparent from the following detailed description with reference to the accompanying drawings.

DETAILED DESCRIPTION OF THE PREFERRED EMBODIMENT

Figure 4:
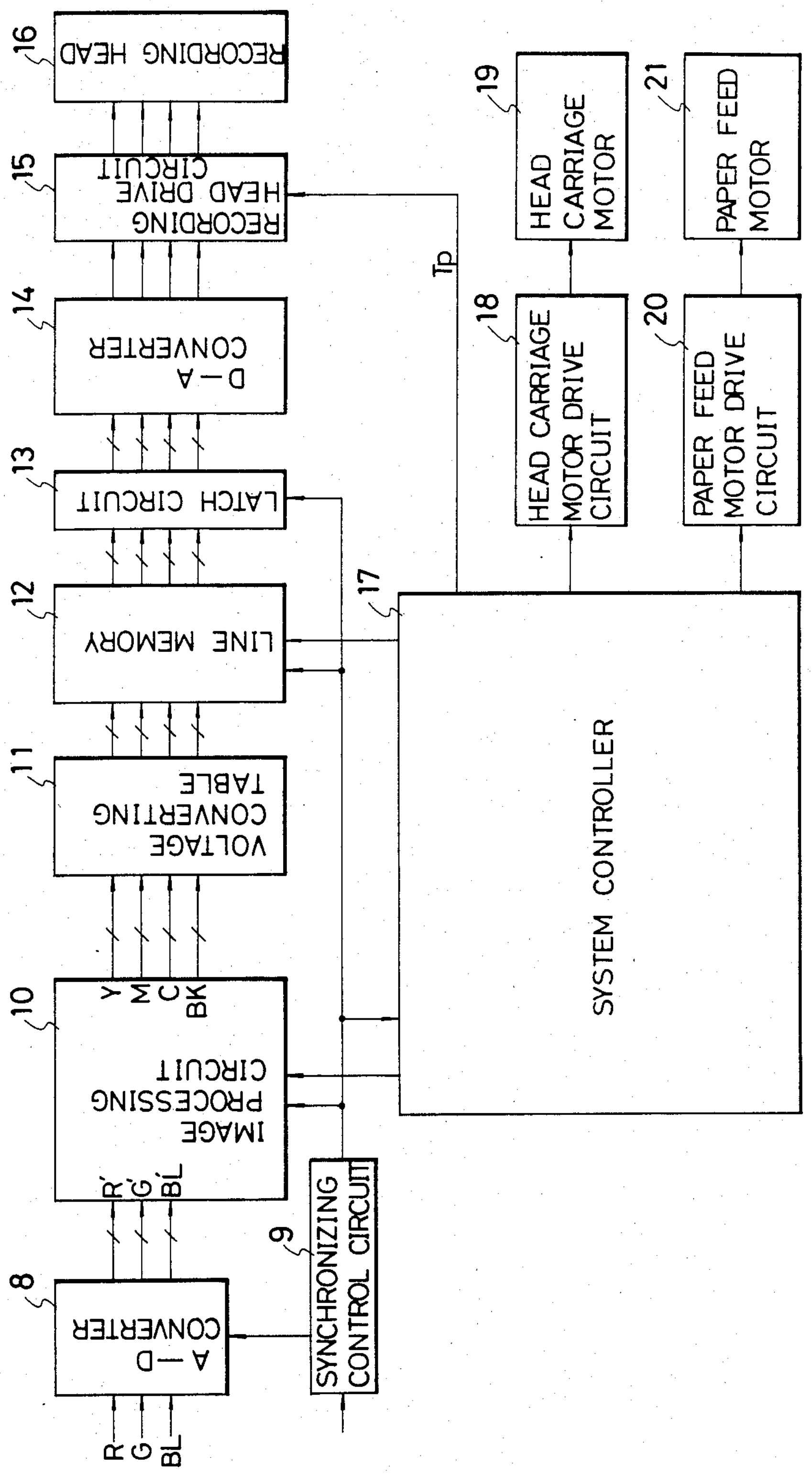
FIG. 4 is a block diagram showing a practical example of a recording apparatus to which a recording head control method according to the present invention was employed.

FIG. 4 shows an example of a multi-recording head recording apparatus to which the present invention was applied, in which a numeral 8 denotes an A-D converter which converts the input image signals R, G and BL to the digital signals R', G' and BL' respectively on the basis of sync signal Sync which was input to a synchronizing control circuit 9 and supplies them to an image processing circuit 10. In this image processing circuit 10, the input signals R', G' and BL' are converted to chrominance density signals Y, M, C and BK for every recording liquid. These density signals converted are input to the voltage converting table circuit 11 and are converted to the digital data corresponding to the voltage values which are applied to the recording heads. These data are input to the line memory 12 and the data of the necessary capacity are stored therein. These digital data stored are fetched into the latch circuit 13 at a predetermined timing and are converted to the analog signals by the D-A converter 14. In addition, the image processing circuit 10, line memory 12 and latch circuit 13 are also controlled by the sync signal Sync which is input to the synchronizing control circuit 9.

The outputs of the D-A converters 14 are input to recording head drive circuit 15 and are controlled responsive to the recording liquid discharge timing pulse $T_p$ which has a predetermined timing, so that a predetermined drive voltage is applied to each liquid jet recording head 16 of the drop-on-demand type. A system controller 17 comprises a microprocessor and the like. This controller 17 controls a head carriage motor 19 through a head carriage motor drive circuit 18 and a paper feed motor 21 through a paper feed motor drive circuit 20, respectively, as well as above-mentioned circuits at predetermined timings, thereby forming a desired image.

The voltage converting table circuit 11 is controlled so as to output a voltage less than the coloring threshold value, for example, a zero voltage to the recording heads which are not driven at the respective time points among the recording heads 16. Therefore, even if the discharge timing pulse is always applied during the printing interval, no recording liquid will be discharged from the relevant recording heads.

Figure 1:
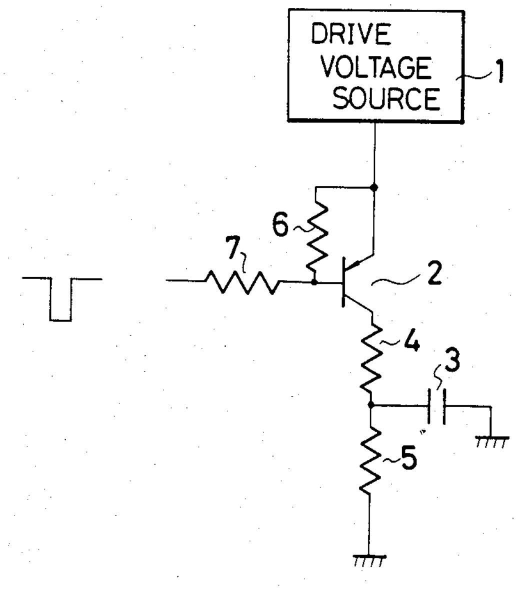
FIG. 1 (PRIOR ART)
FIG. 1 is a diagram showing the conventional recording head drive circuit.
Figure 2:
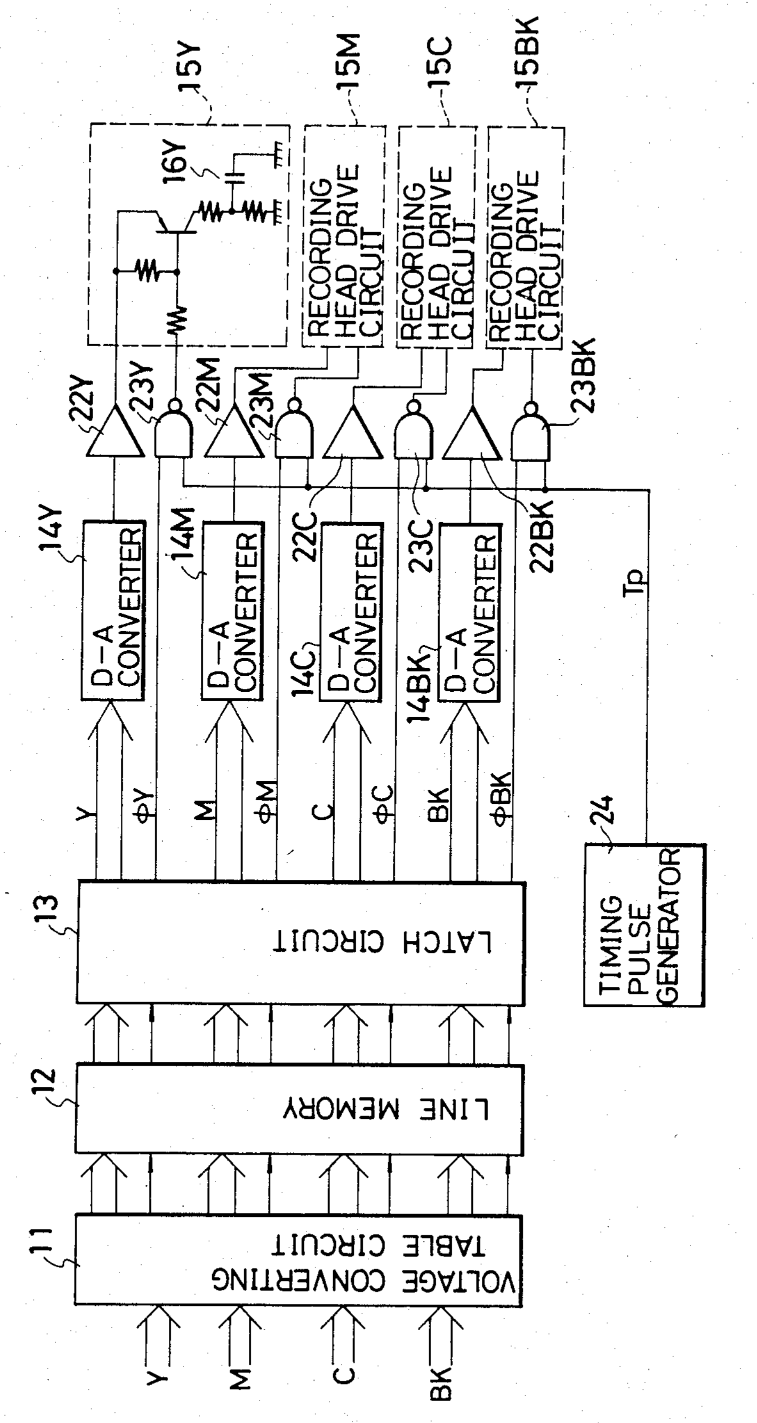
FIG. 2 (PRIOR ART)
FIGS. 2 and 3 are block diagrams showing practical examples of the conventional recording apparatuses, respectively.
Figure 3:
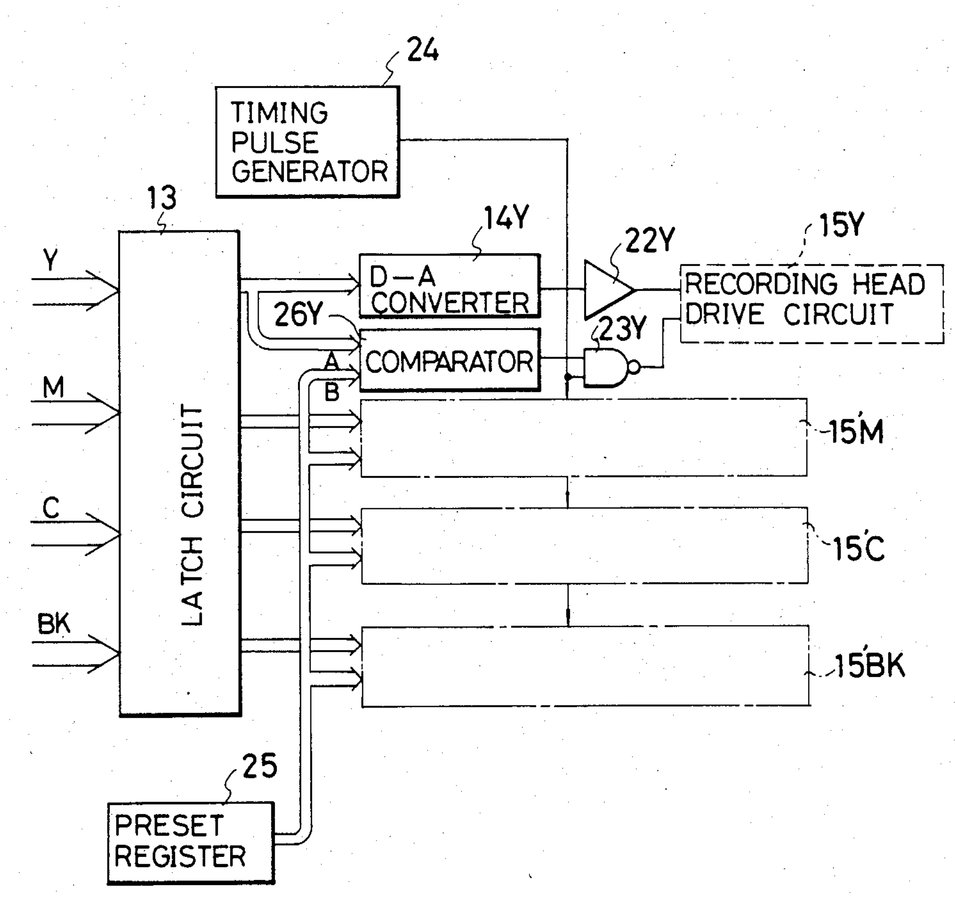
FIG.3 (PRIOR ART)
Figure 5:
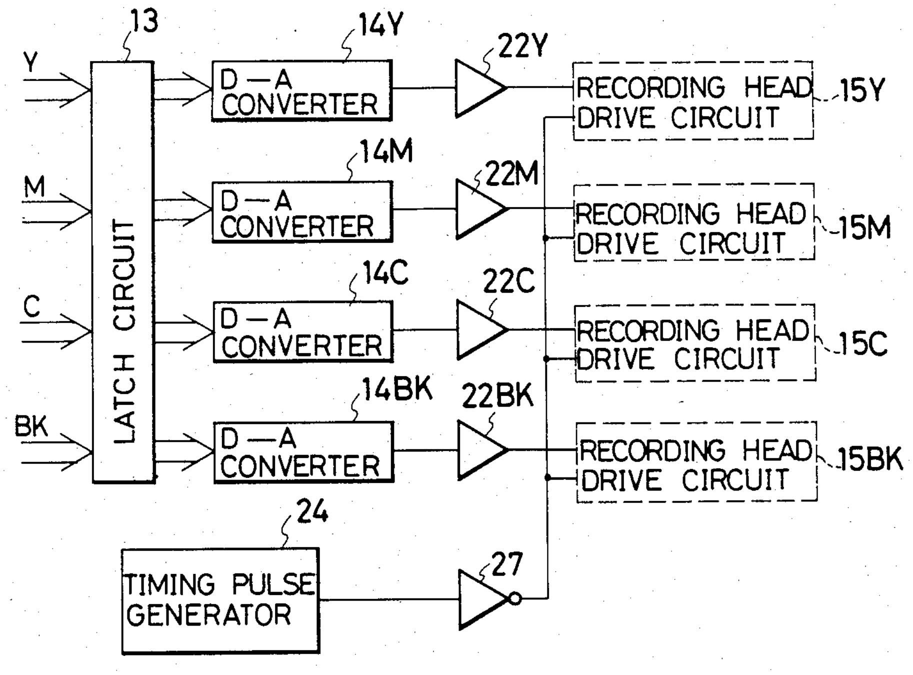
FIG. 5 is a block diagram showing the details of the main part of the recording apparatus of FIG. 4.

FIG. 5 shows the main part of the recording apparatus of FIG. 4 for comparison with the conventional apparatuses shown in FIGS. 2 and 3. In FIG. 5, the circuit arrangement at the front stage of the latch circuit 13 is omitted, and this circuit 13 and the following circuit arrangement are shown. It can be seen from this diagram that the timing pulse $T_p$ which is output from the timing pulse generator 24 is input to the recording head drive circuits 15Y–15BK through an inverter 27, together with the outputs of the amplifiers 22Y–22BK for respectively amplifying the outputs of the D-A converters 14Y–14BK. The recording head drive circuits 15Y to 15BK are similarly constituted as the circuit 15Y of FIG. 2. As explained in conjunction with FIG. 4, even in the case where the timing pulse $T_p$ is always supplied to the drive circuits, the drive voltages to the recording heads which are not driven are controlled to be less than the coloring threshold value; therefore, no recording liquid will be discharged from the relevant heads. It will be appreciated from the comparison of FIGS. 5, 2 and 3 that the circuit arrangement among the D-A converters 14Y–14BK and the recording head drive circuits 15Y–15BK is remarkably simplified in case of FIG. 5.

In this way, the example has been described whereby the present invention was applied to the recording apparatus having the liquid jet heads; however, the present invention is not limited to this but can be broadly applied to the recording head control method in noimpact recording apparatuses. In embodying the present invention, for example, the recording heads 16 of FIG. 4 corresponding to the number of chrominance signals are needed. But the voltage converting table circuit 11 as the control circuit and the recording head drive circuit 15 may be respectively provided for every recording head 16 or may be commonly provided for a plurality of recording heads.

As described above, the recording head drive control apparatus of the invention comprises: a recording head whose recording density varies in response to the drive signal; a drive circuit to drive the recording head; and a control circuit to output the drive signal throuh the drive circuit to the recording head, wherein the drive timing pulse is supplied to the drive circuit even when the recording head is not driven, and at this time the control signal which is output from the control circuit is controlled to less than the recording threshold value of the recording head. Therefore, in particular, the recording head drive control section in the recording apparatus can be constituted by a simple circuit.

In addition, the recording head drive control apparatus of the invention comprises: a plurality of recording heads whose coloring densities vary respectively in response to the drive signals; drive circuits to drive the recording heads; and a control circuit to output the drive signals through the drive circuits to the recording heads, wherein the drive timing pulse is supplied to the drive circuits even when all of or a part of the plurality of recording heads are not driven, and at this time the levels of the drive signals corresponding to the recording heads which are not driven among the drive signals which are output from the control circuit are controlled to less than the coloring threshold value of the relevant recording heads. Therefore, particularly, the multihead drive control section in the multihead recording apparatus such as a full color printer and the like can be constituted by a simple circuit.

Although the present invention has been shown and described with respect to a particular embodiment various changes and modifications which are apparent to a person skilled in the art to which the invention pertains are deemed to lie within the spirit and scope of the invention.

What we claim is:

1. A recording apparatus comprising:

a plurality of recording heads for recording with recording densities that vary in response to the level of drive signals;

a plurality of drive circuits for driving said plurality of recording heads;

a control circuit for outputting variable-level drive signals through said drive circuits to said recording heads; and timing pulse supplying means for supplying drive timing pulses for said recording heads to said drive circuits, wherein said supplying means supplies the drive timing pulses during operation of the recording apparatus even when all or some of said plurality of recording heads are not to record and said control circuit controls the levels of the drive signals for the recording heads which are not to record to be less than a threshold value below which said recording heads do not perform recording.

2. A recording apparatus according to claim 1, wherein each said drive circuit has a switching element to control the applying of the drive signal to said recording head, and said switching element is controlled in response to said timing pulse.

3. A recording apparatus according to claim 1, wherein said control circuit has a converting table for converting a density signal indicative of a recording density to a digital signal corresponding to a voltage value which is applied to the recording head.

4. A recording apparatus according to claim 3, wherein said control circuit further has a D-A converter for converting the digital signal output of said converting table to an analog signal.

5. A recording apparatus according to claim 4, wherein when said recording head is not to record said converting table outputs a digital signal such that the voltage level of said analog signal becomes substantially zero.

6. A recording apparatus according to claim 1, wherein said recording head is a liquid jet recording head of the drop-on-demand type.

7. A recording apparatus according to claim 6, wherein said liquid jet recording head discharges an ink droplet due to the contraction or enlargement of a piezoelectric element.

8. A recording apparatus according to claim 1, wherein the recording colors of said plurality of recording heads differ, respectively.

9. A recording apparatus comprising:

a plurality of liquid jet recording heads of the drop-on-demand type;

a plurality of drive circuits for driving said plurality of recording heads;

a plurality of drive signal control circuits for outputting drive signals through said drive circuits to said recording heads; and timing pulse generating means for generating drive timing pulses for said recording heads to said drive circuits, wherein said generating means generates the drive timing pulses during the operation of the recording apparatus and supplies the drive timing pulses to all of said recording heads and each of said control circuits outputs drive signals to control a corresponding one of said recording heads for recording or non-recording operation of said corresponding recording head.

10. A recording apparatus according to claim 9, wherein the quantity of liquid ejected from each of said recording heads varies according to the level of the corresponding drive signal.

11. A recording apparatus according to claim 9, wherein each said drive circuit has a switching element to control the application of the drive signal to the corresponding one of said recording heads, and said switching element is controlled in response to said drive timing pulse.

12. A recording apparatus according to claim 9, wherein each said control circuit has a converting table for converting a density signal indicative of a recording density to a digital signal corresponding to a voltage value which is applied to the corresponding one of said recording heads.

13. A recording apparatus according to claim 12, wherein each said control circuit further has a D-A converter for converting the digital signal output of said converting table to an analog signal.

14. A recording apparatus according to claim 13, wherein, when the one of said recording heads corresponding to one of said control circuits is not to record, the corresponding one of said converting tables outputs a digital signal such that the voltage level of the analog signal for that recording head becomes substantially zero.

15. A recording apparatus according to claim 9, wherein each of said liquid jet recording heads discharges an ink droplet due to the contraction or enlargement of a piezo-electric element.

16. A recording apparatus according to claim 9, wherein the recording colors of said plurality of recording heads differ from each other.

* * * * *